Sept. 20, 1960     R. H. RISTINE, JR     2,953,058
PRIMER FEED MECHANISM
Filed Sept. 15, 1958     3 Sheets-Sheet 1
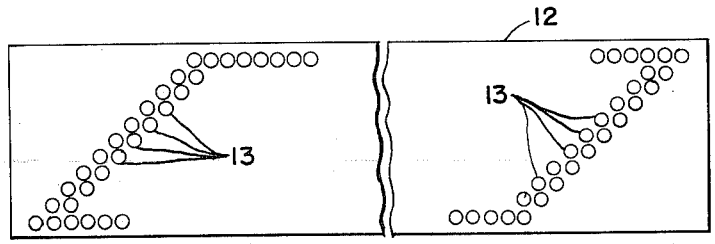
FIG. 1.
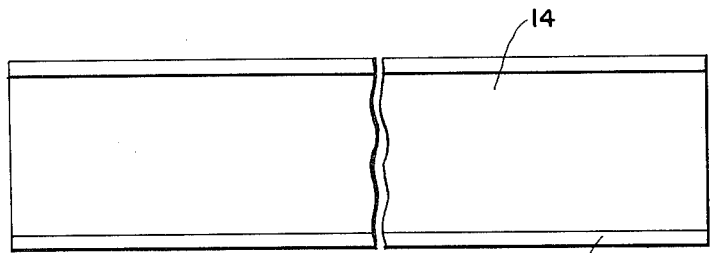 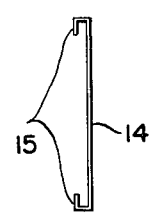
FIG. 2.     FIG. 3.
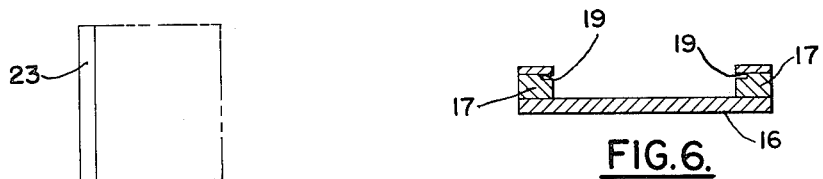
FIG. 6.
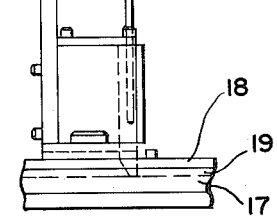
FIG. 8.     FIG. 7.
INVENTOR.
ROBERT H. RISTINE JR.
BY
*S. J. Rotondi, A. J. Dupont & H. R. Johns*

Sept. 20, 1960     R. H. RISTINE, JR     2,953,058
PRIMER FEED MECHANISM

Filed Sept. 15, 1958     3 Sheets-Sheet 2

INVENTOR.
ROBERT H. RISTINE JR.

BY
S. J. Rotondi, A. J. Dupont & H. R. Johns

Sept. 20, 1960     R. H. RISTINE, JR     2,953,058
PRIMER FEED MECHANISM

Filed Sept. 15, 1958     3 Sheets-Sheet 3

*INVENTOR.*
ROBERT H. RISTINE JR.
BY
*S. J. Rotondi, A. J. Dupont & H. R. Johns*
AT TORNEYS:

United States Patent Office 2,953,058
Patented Sept. 20, 1960

2,953,058

PRIMER FEED MECHANISM

Robert H. Ristine, Jr., Philadelphia, Pa., assignor to the United States of America as represented by the Secretary of the Army Filed Sept. 15, 1958, Ser. No. 761,273

4 Claims. (Cl. 86—45)

(Granted under Title 35, U.S. Code (1952), sec. 266)

The invention described herein may be manufactured and used by or for the Government for governmental purposes without the payment of any royalty thereon.

This invention relates to the manufacture of explosive cartridges and more especially to a mechanism and method of operation for feeding primers to a machine by which they are each inserted into a different cartridge case.

Heretofore, this operation has involved, among numerous other steps, (1) assembling the primers in an inspection plate, (2) inspecting one end of the primers, (3) inverting the plate and inspecting the other end of the primers, (4) emptying the primers into a screen bottom tray, and (5) after numerous intervening steps, emptying the primers onto an inverting table where they are inverted onto a slide from which they are fed by gravity onto a belt which delivers them to the primer inserting machine.

In accordance with the present invention, the above procedure is simplified by (1) assembling the primers in an inspection plate, (2) inspecting one end of the primers and (3) transferring the primers to a magazine where their other end is inspected and where they are retained during various steps until they are delivered to the primer inserting machine. This simplified procedure has the important advantage that it reduces the operational time, involves less handling of the primers with a consequent reduction in the danger of mass detonation of the primers, and can be carried out with a relatively small personnel.

The invention will be better understood from the following description when considered in connection with the accompanying drawings and its scope is indicated by the appended claims.

Referring to the drawings:

Fig. 1 is a top view of a magazine adapted to receive the primers,

Figs. 2 and 3 illustrate the lid of this magazine,

Figure 4:
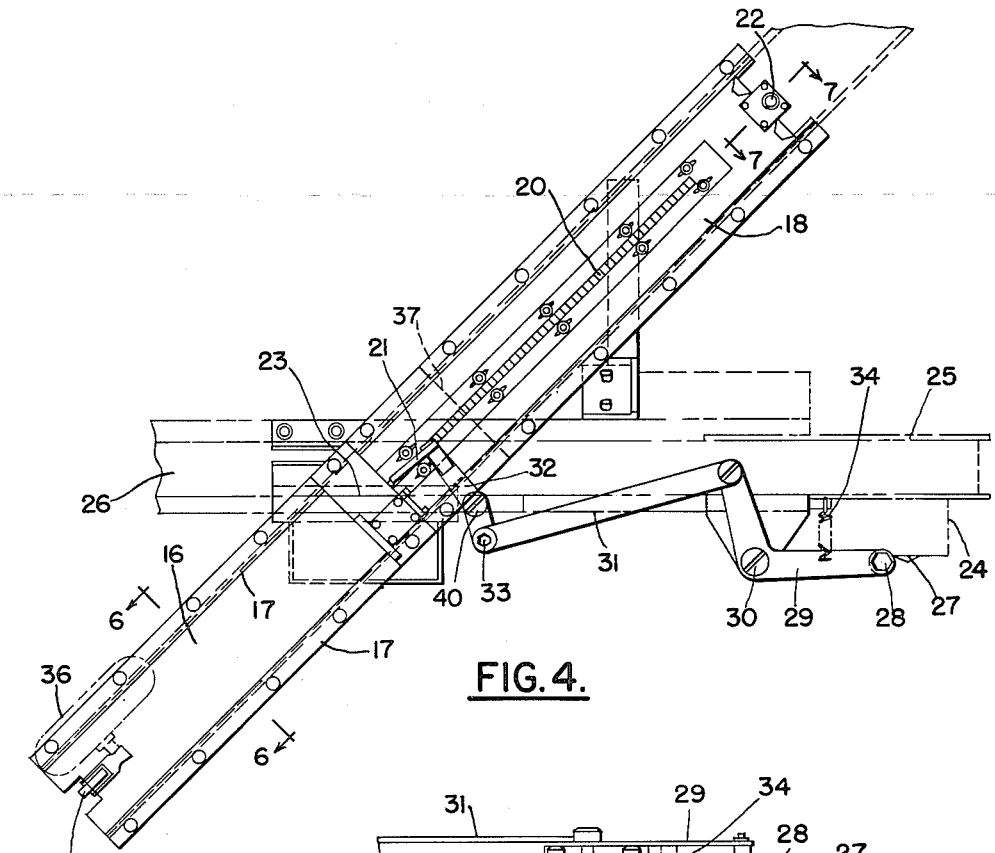
Figure 5:
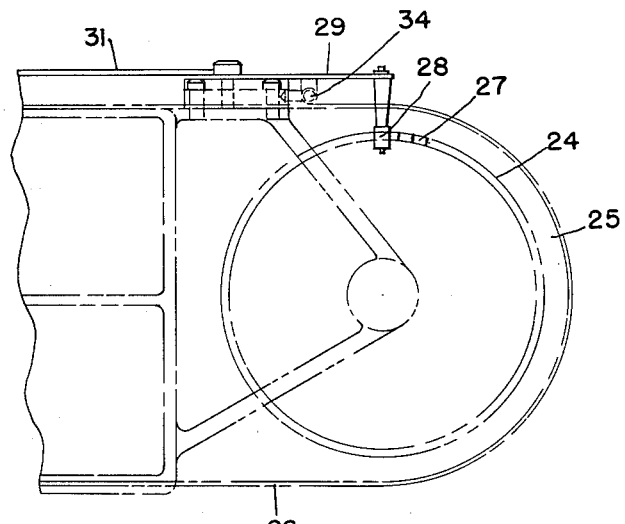
Figure 9:
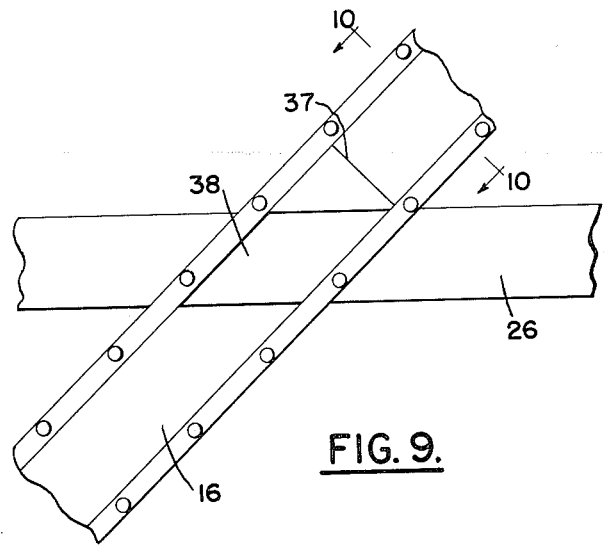
Figure 10:

Fig. 4 is a plan view of the primer feed mechanism as associated with the belt conveyor of a conventional primer insert machine, Fig. 5 is a side view of the mechanism illustrated by Fig. 4, Fig. 6 is a section taken on the line 6—6 of Fig. 4, Fig. 7 is a section taken on the line 7—7 of Fig. 4 and illustrating a catch fixed to a member through which the primer tray is moved, Fig. 8 illustrates a guardian solenoid which functions to stop the primer inserting machine when the primer magazine has reached the end of its travel, Fig. 9 is a simplified view of the base member 16 and the conveyor belt 26 and illustrates the opening 38 in the base member through which the primers drop onto the conveyor belt, and Fig. 10 is a section taken on the line 10—10 of Fig. 9 and illustrates the stop 37 which engages the magazine cover 14 as the magazine is moved along the base member 16 by the bed plate 18.

As can be seen from Figs. 1, 2 and 3, the primer magazine 12 has a plurality of recesses 13 each adapted to receive a single primer. While only a few of these recesses are shown in Fig. 1, it is to be understood that they are distributed over the entire area between the two groups shown. As utilized in practice, the magazine 12 has 510 recesses which are located by a master plate.

As pointed out in a copending application of R. Donnard, Serial No. 734,064, filed May 8, 1958, for "Primer Magazine," dry lead styphnate primers in contact with one another are subject to mass detonation and the probability of such detonation is greatly minimized by the use of a magazine having recesses each adapted to receive a single primer. The primer magazine of this copending application, however, is adapted for use only in the final stage of the operation and functions through gravity to feed the primers onto the belt conveyor of the primer inserting machine.

The primer magazine of the present invention differs from that of the copending application in that it is adapted to retain the primers throughout the numerous steps following the transfer of the primers from the inspection plate to it.

The magazine 12 has a cover 14 which is folded at its opposite sides to form extensions 15 (see Fig. 3). These extensions engage the bottom of the magazine 12 as the lid 14 is slid onto it. With the lid in place, the primers are held in the recesses 13 so that mass detonation of them is prevented during the various operations required to prepare them for insertion into the cartridge cases. From the magazine 12 the primers are fed to the conveyor belt of a primer inserting machine by moving the magazine with respect to its lid so that the primers are dropped onto the belt one row at a time.

The mechanism by which this movement of the magazine 12 is effected is illustrated by Figs. 4 to 8. This mechanism includes guides 17 which are supported on a member 16 and along which the magazine 12 is moved by means of a bed plate or drive member 18 the edges of which slide in grooves 19 (see Fig. 6) of the guides 17. The slidable bedplate 18 has fixed to it a rack 20 arranged to cooperate with a pawl 21 and has at one of its ends a catch 22. A solenoid 23 is mounted on the guides 17 at a point approximately midway between their ends.

The power for driving the pawl 21 is derived from a rotatable member 24 fixed to a wheel 25 which drives the belt conveyor 26 of the primer insert machine. It will be noted that the rim of the member 24 has a laterally extending cam 27 which engages a follower 28 once for every revolution of the member 24.

The cam follower 28 is fixed to an arm 29 which is pivoted at the point 30 and has its other end hinged to one end of a member 31. The other end of the member 31 is hinged to a member 32 at the point 33 and is pivoted at point 40 and operates to move the pawl 21. The pawl is hinged to member 32 and the follower 28 is held against the rim of the rotatable member 24 by means of a spring 34.

In the operation of the mechanism of Figs. 4 to 8, the bedplate 18 is placed upon the bottom of the magazine 12 and the two are started along the tracks or guides 17 with the opposite edges of the bedplate in the grooves 19 (see Fig. 6). As the bedplate is thus moved, there is finally reached a point where the catch 22 engages the ends of members 12, 16 and 18 at the same time the cover 14, which is now beneath the magazine 12 engages a stop 37 (shown in Fig. 10) by which its progress along the guides 17 is arrested.

Automatic movement of the bedplate 18 and magazine 12 is initiated by raising the catch 22 so that it engages only the magazine 12 and the bedplate (Fig. 7) and swinging the pawl 21, which is hinged to the member 32, over into engagement with the rack 20. Thereafter, the bedplate and magazine are moved one notch for each revolution of the member 24, the various parts being so proportioned that successive movements expose successive rows of the recesses 13 from which primers are simultaneously dropped upon the conveyor belt 26 through opening 38 in the base member 16.

When the bedplate 18 reaches the end of its travel, the magazine has been completely emptied and a member 35 is actuated to operate a switch 36. This is in the circuit of the solenoid 23 which functions to deenergize the primer insert machine. (For purposes of clarity in the drawings the connecting wires between member 25, the switch 36 and the solenoid 23 have not been shown.) Thereafter the bedplate and the magazine with its cover are withdrawn from the guides and the operation is repeated with a filled magazine.

I claim:

1. In an apparatus for feeding primers to a primer insert machine the combination of a primer conveyor belt driven by a wheel, a primer magazine having a longitudinally slidable lid, means forming transversely of said belt a guideway having grooves at its opposite sides and adapted to receive said magazine with said lid underneath said magazine, said guideway having a stop arranged to engage said lid at a point adjacent said belt and an opening at a point directly above said belt, a drive member releasably attached to said magazine and having longitudinal edges, slidable in said grooves, and a mechanical coupling arranged between said wheel and said drive member to move said magazine along said guideway in a predetermined relationship with the movement of said conveyor belt.

2. In an apparatus for feeding primers to a primer insert machine the combination of a primer conveyor belt driven by a wheel, a primer magazine having rows of recesses each adapted to receive a single primer and having a longitudinally slidable lid, means forming transversely of said belt a guideway having grooves at its opposite sides and adapted to receive said magazine in an inverted position, said guideway having a stop arranged to arrest said lid at a point adjacent said belt and an opening at a point directly above said belt, a drive member releasably attached to said magazine and having longitudinal edges arranged to slide in said grooves, and a mechanical coupling arranged between said wheel and said drive member to move said magazine and expose successive rows of said recesses to said belt in response to successive revolutions of said wheel.

3. In an apparatus for feeding primers to a primer insert machine the combination of a primer conveyor belt driven by a wheel, a primer magazine having rows of recesses each adapted to receive a single primer and having a longitudinally slidable lid, means forming transversely of said belt a guideway having grooves at its opposite sides and adapted to receive said magazine in an inverted position, said guideway having a stop arranged to arrest said lid at a point adjacent said belt and an opening at a point directly above said belt, a drive member releasably attached to said magazine and having longitudinal edges arranged to slide in said grooves, a mechanical coupling arranged between said wheel and said drive member to move said magazine and expose successive rows of said recesses to said belt in respone to successive revolutions of said wheel and means for deenergizing said insert machine in response to the movement of said magazine to a position where the last row of said recesses is exposed to said belt.

4. An apparatus in accordance with claim 2 wherein said mechanical coupling includes a rack fixed to said drive member and arranged to be driven by a pawl and wherein said pawl is activated by means including a cam rotated with said wheel.

References Cited in the file of this patent

UNITED STATES PATENTS

| | | |
|---|---|---|
| 2,615,363 | Martyn | Oct. 28, 1952 |
| 2,794,359 | Lyman | June 4, 1957 |